(12) United States Patent
Bardazzi

(10) Patent No.: US 7,669,518 B2
(45) Date of Patent: Mar. 2, 2010

(54) ESPRESSO COFFEE MACHINE

(75) Inventor: Bruno Bardazzi, San Piero a Sieve (IT)

(73) Assignee: Espressocap S.r.l. (IT)

( * ) Notice: Subject to any disclaimer, the term of this patent is extended or adjusted under 35 U.S.C. 154(b) by 1040 days.

(21) Appl. No.: 10/559,674

(22) PCT Filed: Jun. 8, 2004

(86) PCT No.: PCT/EP2004/006178

§ 371 (c)(1),
(2), (4) Date: Dec. 6, 2005

(87) PCT Pub. No.: WO2005/002405

PCT Pub. Date: Jan. 13, 2005

(65) Prior Publication Data

US 2006/0130666 A1 Jun. 22, 2006

(30) Foreign Application Priority Data

Jun. 26, 2003 (IT) .......................... GE2003A0045

(51) Int. Cl.
*A47J 31/40* (2006.01)
(52) U.S. Cl. ...................... 99/295; 99/289 R; 99/302 R
(58) Field of Classification Search .................. 99/295, 99/302 R, 289 R, 289 D
See application file for complete search history.

(56) References Cited

U.S. PATENT DOCUMENTS

| | | | | |
|---|---|---|---|---|
| 3,209,676 A | * | 10/1965 | Zimmermann et al. | 99/289 R |
| 3,229,612 A | * | 1/1966 | Brown | 99/282 |
| 3,292,527 A | * | 12/1966 | Stasse | 99/295 |
| 3,384,004 A | * | 5/1968 | Perlman et al. | 99/289 R |
| 4,103,602 A | * | 8/1978 | Oggioni et al. | 99/289 D |
| 4,253,385 A | * | 3/1981 | Illy | 99/281 |
| 5,680,809 A | * | 10/1997 | Dings et al. | 99/289 D |
| 6,490,966 B2 | * | 12/2002 | Mariller et al. | 99/289 R |
| 2002/0002913 A1 | | 1/2002 | Mariller et al. | |

FOREIGN PATENT DOCUMENTS

| | | |
|---|---|---|
| EP | 1 219 217 | 7/2002 |
| WO | WO 01/15582 | 3/2001 |

* cited by examiner

*Primary Examiner*—Reginald L Alexander
(74) *Attorney, Agent, or Firm*—Stites & Harbison PLLC; Marvin Petry; Stephen J. Weyer

(57) ABSTRACT

Espresso coffee machine comprising a reservoir for the water (20), a pump (21) for delivering the said water to a boiler (24), a hot water supply unit (2, 102, 122, 4, 304), and filter holder means (1, 301, 3, 103) for housing a portion of ground coffee (16), preferably pre-packaged, and provided with coffee delivery means (201; 203), characterized in that the said supply unit (2, 102, 122, 4, 304) and the said filter holder means (1, 301; 3, 103) are coupled together with a seal and the trajectory of the coupling movement lies on a plane substantially perpendicular to the median plane of coupling of the said supply unit (2, 102, 122; 4, 304) and the said filter holder means (1, 301; 3, 103), the facing surfaces of the said supply unit (2, 102, 122; 4, 304) and the said filter holder means (1, 301; 3, 103) coming into contact only at the time of their coupling.

11 Claims, 6 Drawing Sheets

ESPRESSO COFFEE MACHINE

The present invention relates to espresso coffee machines, and in particular it relates to machines into which the coffee is introduced in the form of pre-filled cartridges, known as "filter packs", or the like.

Espresso coffee machines, which until quite recently were substantially designed for professional use, are now also widely used in the domestic setting. To make the use of these machines simpler and more practical, and to ensure the uniformity of the quality standards of the product, in other words the coffee which is delivered, pre-filled portions of ground coffee have been provided for some years, these portions being enclosed in water-permeable containers made from paper, plastics, aluminium or the like, and commonly known as "filter packs".

Espresso machines using this type of product are certainly much simpler to use, and provide a coffee infusion whose characteristics depend solely on the quantity of water used; in practice, the stages such as the filling and tamping down of the filter are eliminated, the number of choices involved in these stages being too high to make the product widely accessible. Moreover, the machines are much cleaner overall, and their maintenance does not present any particular problems.

On the other hand, it must be pointed out that the more traditional type of espresso machine is not easily adaptable to the use of these filter packs, both because the filter packs are rarely produced in such a way as to provide a good seal and consequently a coffee infusion of satisfactory quality, and because, even where a seal can be provided, the relative movement of the parts providing it, namely the filter holder and the unit supplying the pressurized hot water, takes place with the sliding of the corresponding contact surfaces; this can easily cause deformation of the filter pack and consequently a loss of efficiency of the machine operation.

It is therefore the case that the use of pre-filled cartridges or filter packs is limited to automatic or semi-automatic machines constructed on an ad hoc basis to operate with this form of ground coffee supply; these machines, on the one hand are rather complicated in their construction, particularly because of the mechanisms responsible for introducing and extracting the filter packs, and are therefore considerably more expensive than traditional espresso machines. It should also be borne in mind that different machines are frequently designed to house specific types of cartridge, and can accept only these types, thus clearly limiting the user's choice.

The object of the present invention is therefore to provide an espresso coffee machine capable of using pre-filled cartridges, known as filter packs, constructed in an extremely simple way and making use of a stable seal in which the surfaces in contact with each other are not required to slide with respect to each other, and in which the introduction and extraction of the cartridge is carried out in a substantially manual way but is greatly facilitated by the form of construction.

The present invention therefore proposes an espresso coffee machine comprising a reservoir for the water, a pump for delivering the said water to a boiler, a hot water supply unit, and filter holder means for housing a portion of ground coffee, preferably pre-packaged; the said supply unit and the said filter holder means are coupled together with a seal and the trajectory of the coupling movement lies on a plane substantially perpendicular to the median plane of coupling of the said supply unit and the said filter holder means, the surfaces of the said supply unit and the said filter holder means coming into contact only at the time of their coupling.

In a preferred embodiment, the said filter holder means are hinged at one end to the body of the said coffee machine, in the proximity of the said supply unit; advantageously, the filter holder means can be hinged in a detachable way. It may be advantageous that the median plane of coupling is perpendicular to the base plane of the machine body, in such a way that the position of the insertion of the portion of ground coffee into the filter holder means and its extraction therefrom is particularly facilitated. Additionally, the filter holder means can be provided with means for extracting the portion of ground coffee.

The machine according to the invention can be provided with switch means to permit the supply only after the completion of the coupling between the said supply unit and the said filter holder means.

Further advantages and characteristics of the device according to the present invention will be made clear by the following detailed description of some embodiments of the invention, provided, by way of example and without restrictive intent, with reference to the attached sheets of drawings, in which.

Figure 2:
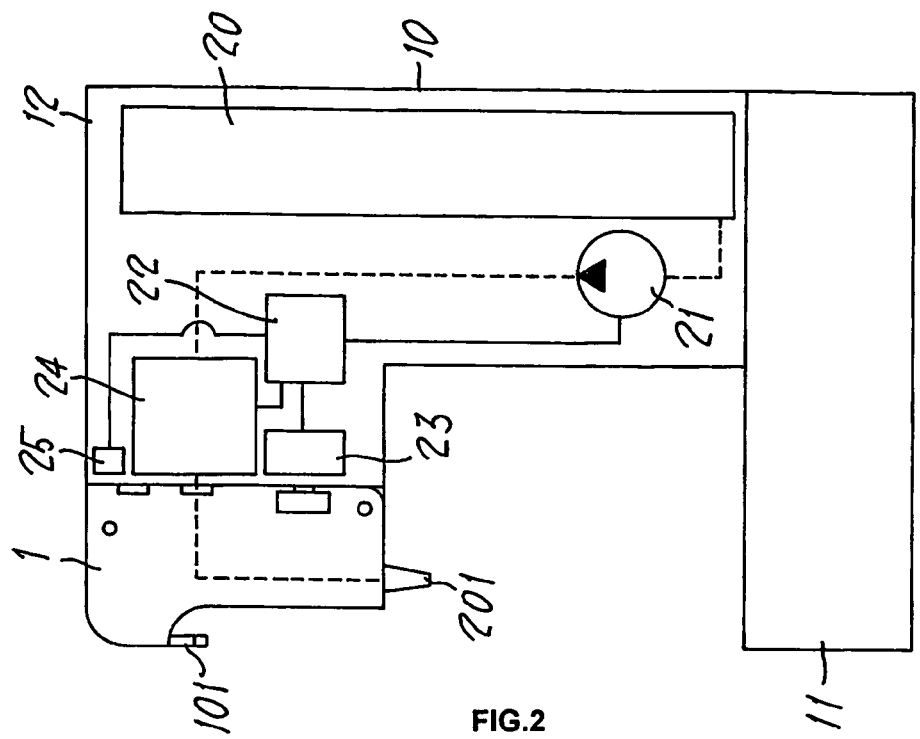
FIG. 2 is a schematic diagram showing the operation of the machine according to the invention.
Figure 1:
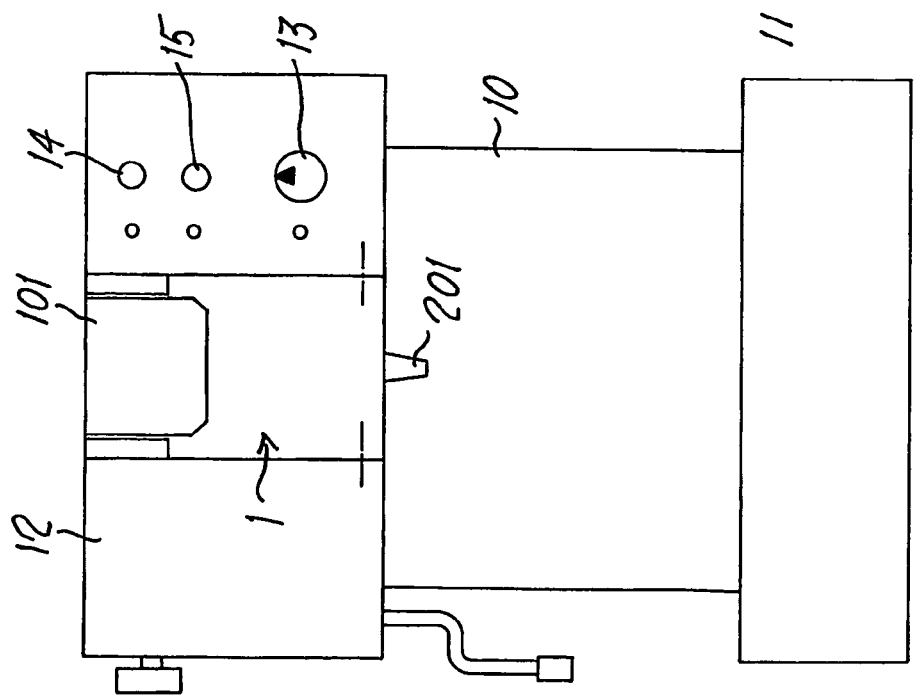
FIG. 1 is a front elevation of a first embodiment of the espresso coffee machine according to the present invention.

FIG. 1 shows an espresso coffee machine according to the present invention; the number 11 indicates the base of the machine, from which there extends a column 10 which terminates at the opposite end in the head 12. The filter holder hatch 1, provided with the lever 101 and the coffee infusion delivery spout 201, is connected with a hinge to the head 12; the control and regulation means comprising the knob 13 and switches 14 and 15 are also located on the head. The machine, as shown in FIG. 2, has within it the reservoir 20, connected to the boiler 24 via the pump 21; the boiler 24, the pump 21 and the timer. 23 associated with the knob 13 are all connected to the control unit 22, which in turn is connected to the switch 25.

Figure 3:
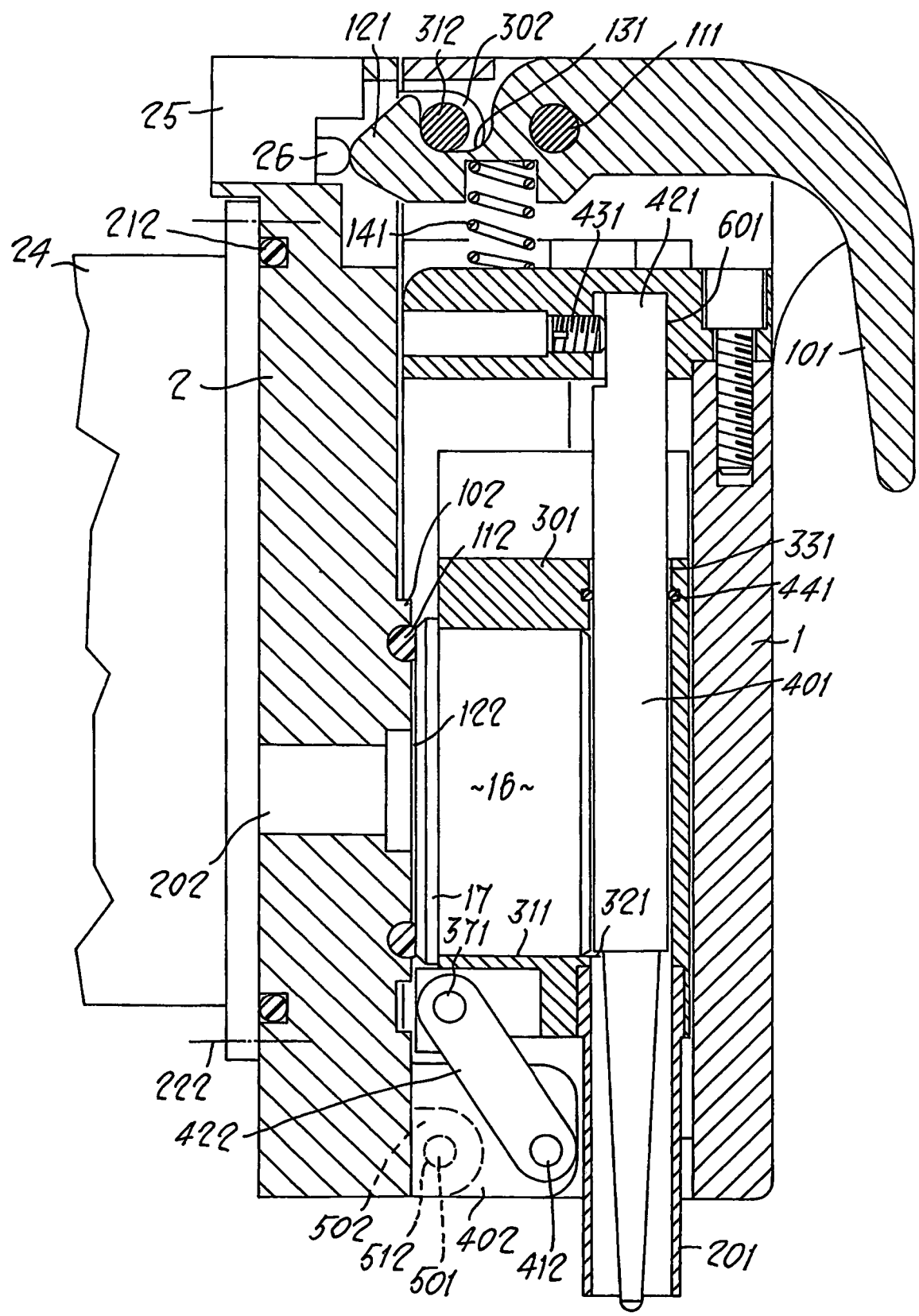
FIG. 3 is a sectional view, taken through the line III-III of FIG. 1, of a detail of the machine according to the invention.

FIG. 3 shows a section through a detail of the machine according to the invention. The hatch 1 is connected to the head 12 of the machine at the position of the plate 2, which communicates, through the passage 202 formed in it, with the boiler 24, to which the said plate is fixed by suitable means 222, sealing means 212 being provided between the boiler 24 and the plate 2. At the end of the passage 202 which opens on the side of the plate facing the hatch 1, there is formed a cylindrical protuberance 102 coaxial with the said passage, on top of which the supply outlet 122 is positioned and is provided with sealing means 112; the flange 17 of the pre-filled cartridge 16 is in contact with the sealing means 112. The filter holder 301 houses the cartridge 16 in its cavity 311, which has in the proximity of its base a radial hole 321 through which it communicates with the delivery spout 201. A further hole 331, provided with sealing means 421, is formed diametrically opposite the hole 321. Through both of the holes there is inserted a rod 401, whose free end is located in the spout 201, while its other end 421 is inserted in a blind hole 601 formed in the hatch 1 and is locked there by means of the catch 431. The filter holder 301 is provided, at its end which carries the spout 201, with a pin 371 to which one end of the lever 422 is coupled, the other end being coupled to the bracket 402 of the plate 2 by means of the pin 412. The hatch 1 is hinged by means of its pin 501 to the hole 512 formed in the lug 502 of the plate 2, which is shown in broken lines in the figure and described more fully below.

At its opposite end, the hatch 1 is provided with a lever 101 which can swing about a pin 111 and which is provided at its opposite end with a tooth 121 and a recess 131 which can interact with the pin 312 projecting from the lug 302 of the plate 2. The lever is forced to a position of interaction with the pin 312 by the spring 141 positioned below the lever, the other end of this spring bearing on the filter holder 301. When the hatch 1 is closed on to the plate 2, the head of the tooth 121 bears on the button 26 of the switch 25.

Figure 4:
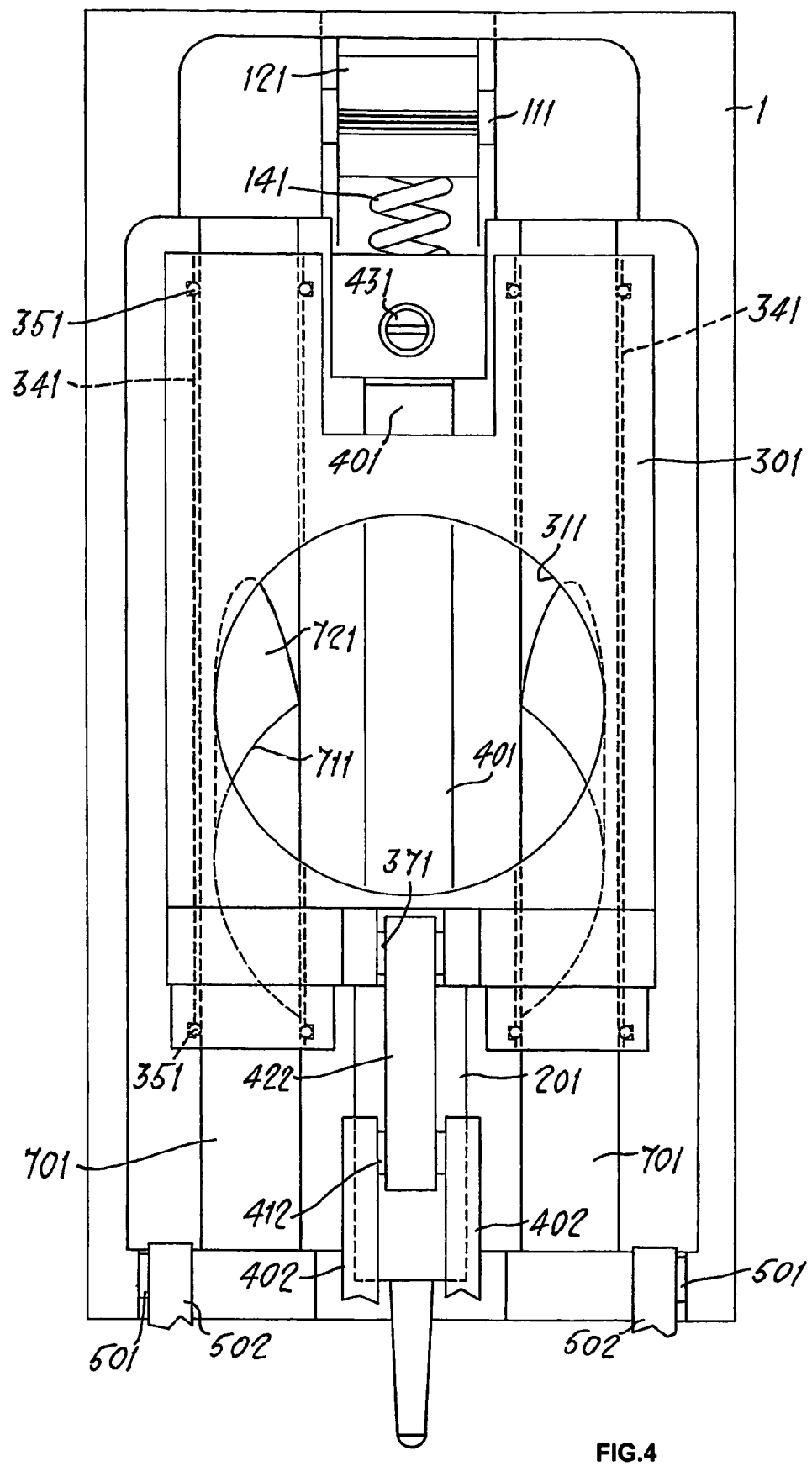
FIG. 4 is a plan view of a detail of the machine according to the present invention.

FIG. 4 is a plan view of the hatch 1 of the machine according to the invention; identical numbers indicate identical parts. As shown in the figure, the filter holder 301 is mounted slidably on two tubular guides 701 fixed to the hatch 1; the guides are inserted into two cylindrical cavities 341 formed along the longer sides of the filter holder 301, and provided at both ends with sealing means 351. Each of the two guides is provided with a recess 711 which faces towards the cavity 311 of the filter holder 301 and is shaped to match this cavity. An inclined surface 721 extends from this recess 711 in the opposite direction to that of the delivery spout 201.

Figure 5:
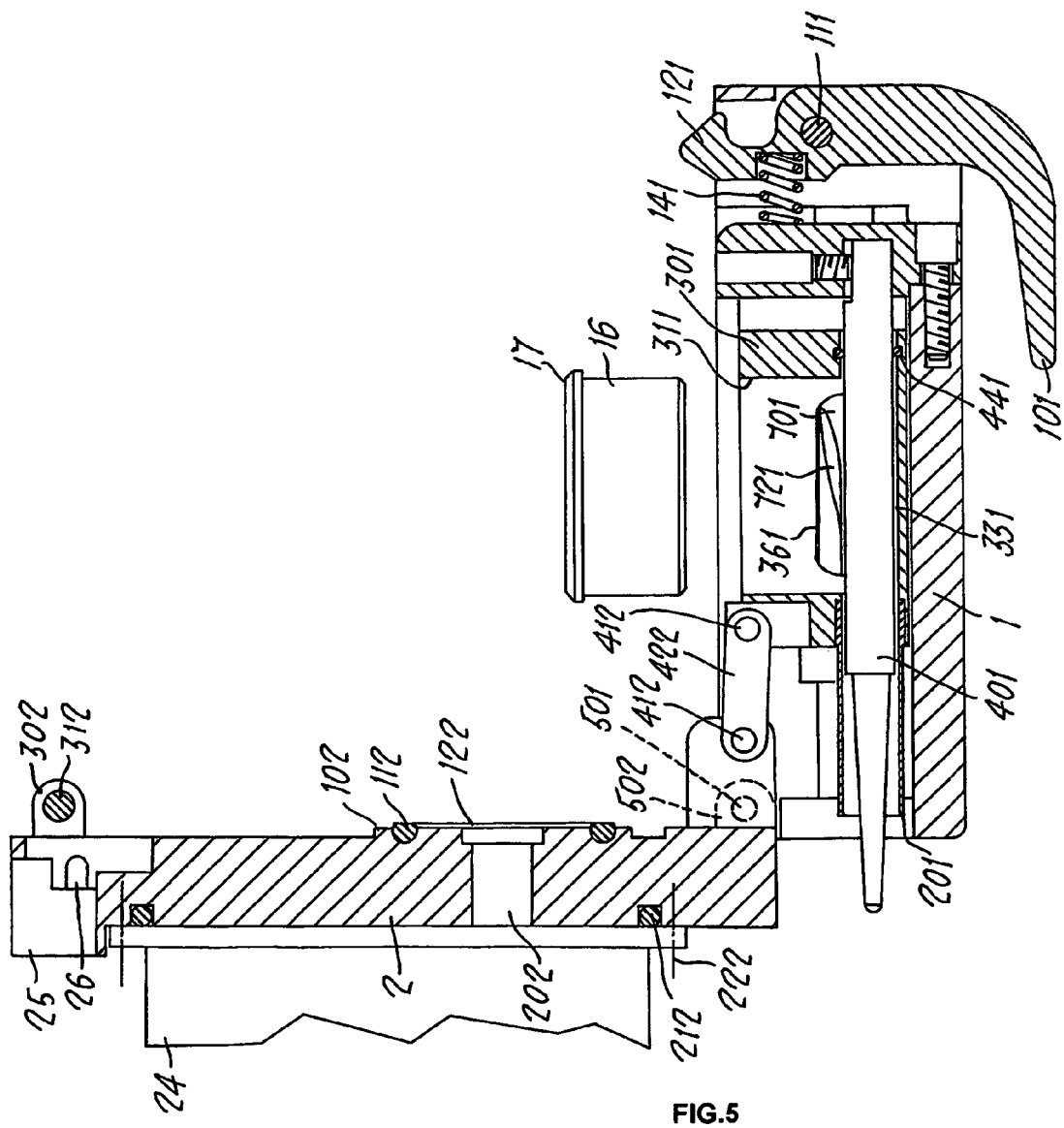
FIG. 5 is a sectional view similar to that of FIG. 3, except for the fact that the illustrated parts are in a different configuration.

In FIG. 5, the hatch 1 is shown in the open configuration with the cartridge 16 extracted from the cavity 311 of the filter holder 301. Two apertures 361, only one of which is visible in FIG. 5, are formed in the cavity 301, along its sides and parallel to the lateral walls of the filter holder 301. The inclined surface 721 of one of the said guides 701 can be seen through the said apertures which intercept the cylindrical cavities 341 in which the guides 701 slide (see FIG. 4). In this open condition, the lever 422 is fully extended and the filter holder 301 is moved towards the end of the hatch 1 which carries the closing lever 101.

Figure 6:
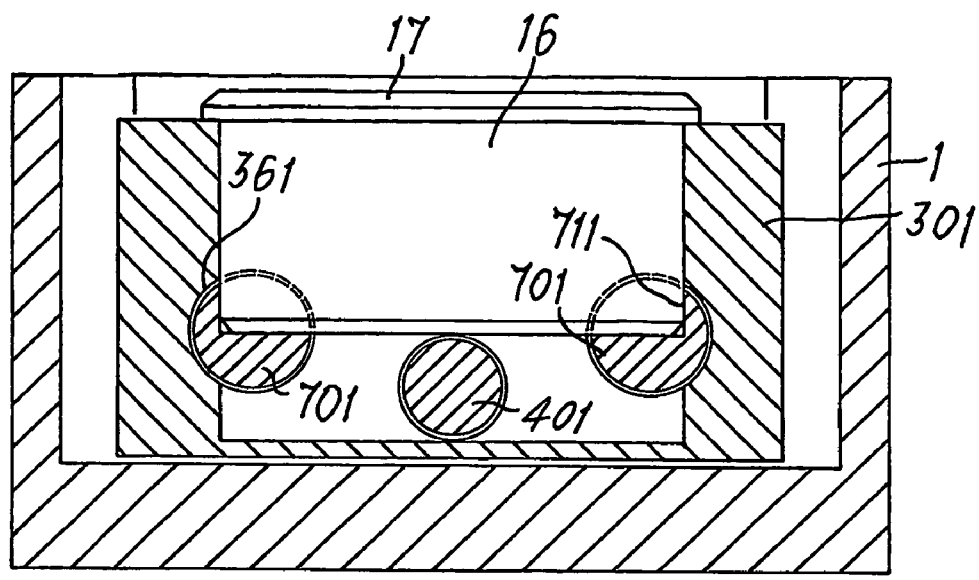
FIGS. 6 and 7 are two sectional views taken through the line VI-VI of FIG. 5, in two different configurations.
Figure 7:
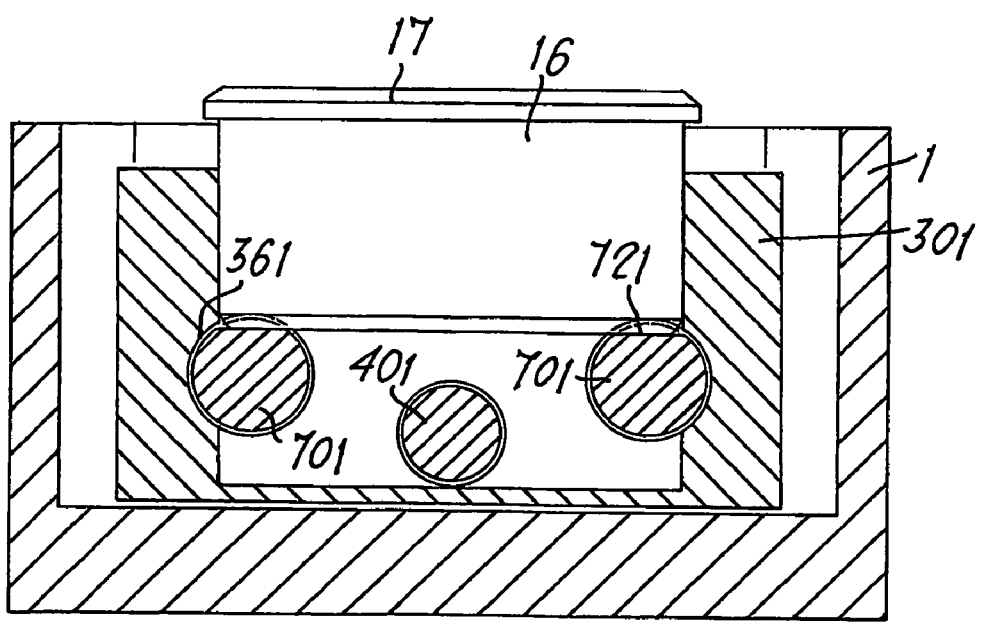

FIGS. 6 and 7 show more clearly the interaction between the cartridge 16 and the guides 701; in the position shown in FIG. 6, which corresponds to that of FIG. 3, the filter holder is positioned in the recesses 711 formed in the guides, and the flange of the cartridge bears on the outlet edge of the cavity 311 of the filter holder 301. In FIG. 7, on the other hand, the filter holder 301 is positioned at the top of the inclined walls 721, and the cartridge 16 is therefore substantially extracted from the cavity 311 of the said filter holder 301.

Figure 8:
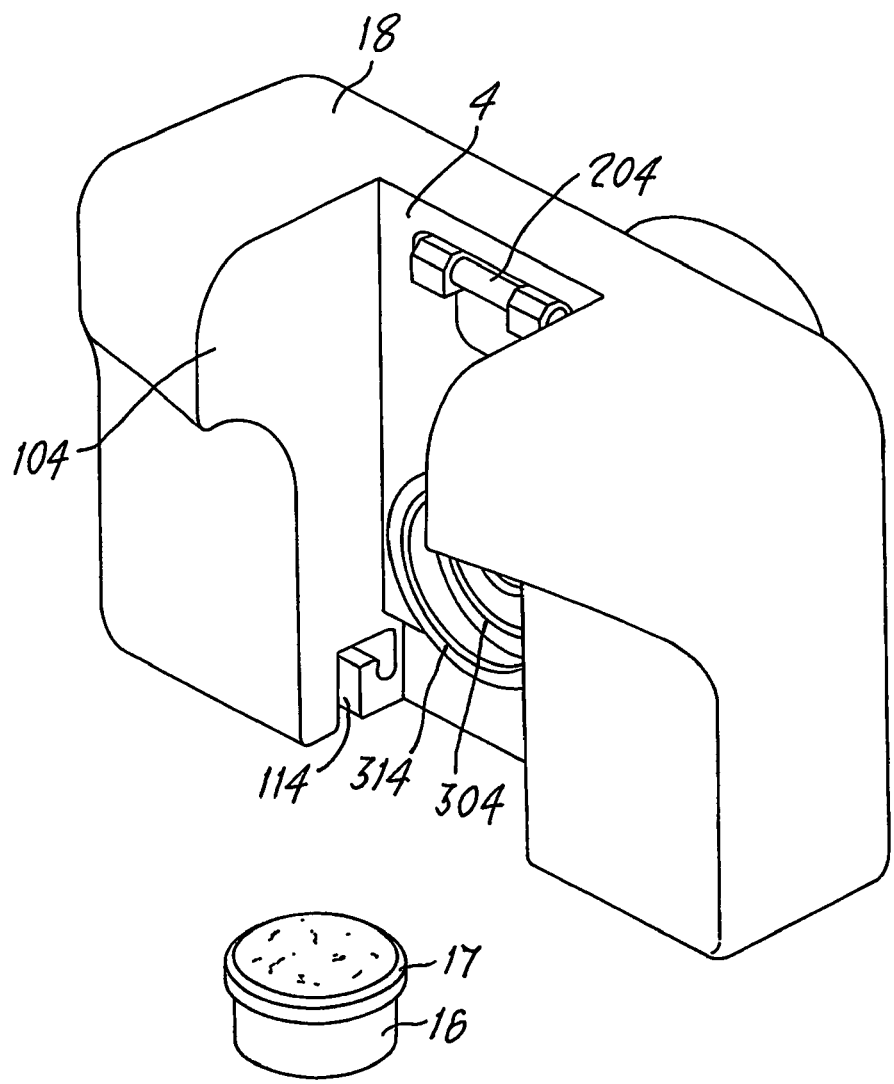
FIG. 8 is an exploded perspective view of a second embodiment of the machine according to the invention.
Figure 8:
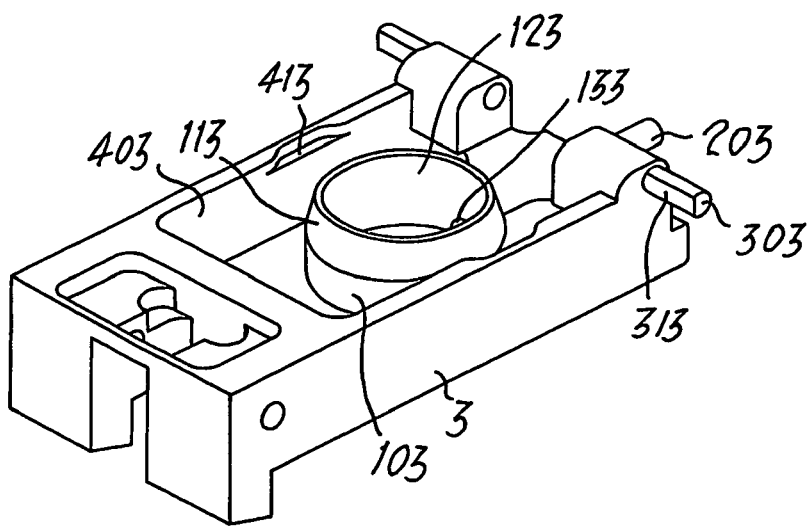

Finally, FIG. 8 shows an alternative embodiment of the present invention. In the head portion 18 of the machine shown in the figure there is formed a cavity 4 in which is housed the supply unit 304, surrounded by an axial sealing flange 314. Recesses 114 formed substantially in the shape of a letter "Γ" (upper-case gamma) are made in the lateral walls 104 of the said cavity 4. A pin 204, perpendicular to the said lateral walls 104, is positioned at the end of the cavity 4 opposite that in which the said recesses are located, on the end wall of the said cavity.

The hatch 3 is provided with a recess 403 in its inner wall, in which a substantially cylindrical filter holder 103, designed to house the cartridge 16 provided with a radial flange 17, is positioned so that it projects axially and is made in one piece with the said hatch 3; however, the terminal edge 113 of the filter holder is noticeably tapered in the upward direction. A radial hole 133 for communication with the delivery spout 203 is formed at the bottom of the cavity 123 of the filter holder 103. Two indentations 413 are formed diametrically opposite each other on the lateral walls of the said recess 403. At the end of the hatch 3 provided with the spout 203, two pins 303 project outwards from the side walls of the said hatch, these pins being provided with a flattening 313 and being capable of interacting with the recesses 114 formed in the lateral walls 104 of the cavity 4 of the head 18.

The operation of the espresso coffee machine according to the present invention will be made clear by the following description. When the machine is prepared for operation, in other words when the master switch 14 is turned on, the next stage consists in the insertion of a cartridge pre-filled with ground coffee into the machine. For this purpose, the hatch 1 is opened, and the machine then appears substantially in the condition illustrated in FIG. 5. The cartridge 16 is inserted into the cavity 311 of the filter holder 301 and the hatch is reclosed onto the plate 2, thus bringing the surface of the cartridge 16 into contact with the surface of the supply outlet 122, as shown in FIG. 3. The pressurized water supply means, in other words the outlet 122, and the filter and filter holder assembly are coupled together with a seal, because of the means 112, and the contact between the facing surfaces does not precede the completion of the coupling; the hatch is locked in the closed position by the interaction of the tooth 121 and recess 131 with the pin 312 of the plate 2, thus ensuring the stability of the said coupling. The possibility of preventing contact between the said two surfaces before the completion of the coupling is sufficient in itself to prevent any deformation of the capsule, which would normally make its use ineffective in ordinary manually loaded espresso coffee machines. This is because most of these machines have a bayonet coupling system, requiring a rotation of the filter holder with respect to the supply unit; this rotation can damage the filter pack or cartridge inserted in the filter holder, thus making it virtually unusable.

When the hatch 1 is closed, the free end of the tooth 121 of the lever 101 acts on the button 26 of the switch 25, which acts as a consent switch; in practice, the machine can operate in this condition only, thus preventing the possibility of pressurized hot water being supplied while the hatch is open. At this point, the pump 21 of the circuit shown in FIG. 2 can be started by a further activation, and consequently the hot water is supplied through the outlet 122 and the resulting coffee is delivered from the spout 201.

Preferably, as in the embodiment illustrated herein, the switch 25 acts as a starter switch, and the dosing of the coffee, in other words the amount of water to be passed through the cartridge 16, is determined by the setting of the timer 23, which can be carried out by means of the knob 13. When the coffee has been delivered, the hatch 1 is reopened, and the lever 422 connected to the bracket 402 of the plate 2 causes the filter holder 301 to slide along the tubular guides 701 of the hatch 1. Consequently, the inclined surfaces 721 of the guides 701 cause the cartridge to emerge from the cavity 311 of the filter holder 301, as shown in FIG. 7. At the same time, the rod 401 inserted in the spout 201 has been enabled to slide for a certain distance into the said spout 201, thus cleaning it and preventing any clogging.

The machine according to the embodiment shown in FIG. 8 is considerably simplified in its structure, while retaining most of the advantages described above. In this case also, the cartridge 16 and the means 304 for supplying the hot pressurized water come into contact only on completion of the sealed coupling, and therefore without the sliding of the facing surfaces with respect to each other. The filter holder in which the cartridge is inserted is fixed with respect to the hatch 3, and is preferably made in one piece with it. The tapering of the terminal edge 113 of the filter holder 103 enables the holder to be inserted more easily into the axial flange 314, and also makes it rather easier for the user to withdraw the cartridge 16, since the radial flange 17 of the cartridge is designed to project outside the said edge 113. This withdrawal operation is additionally facilitated by the presence of the indentations 413 in the walls of the recess 403.

The hatch, which is hinged to the cavity 4 of the head 18 by the insertion of the pins 303 into the Γ-shaped recesses 114 of the lateral walls 104 of the said cavity, can be disengaged easily from this connection, making it particularly easy to wash the hatch.

The machine according to the invention has been illustrated in the embodiments described herein with the filter holder means, consisting of a hatch-shaped support and the actual filter holder itself, hinged to the body of the said machine. However, any type of connection which allows contact between the facing surfaces only at the moment of the sealed coupling can be considered suitable for the purpose.

Preferably, the median plane of coupling of the supply unit and the filter holder means is perpendicular to the base plane of the said machine, and the hinge means are located on the side of the hatch facing the base plane of the machine, in such a way as to facilitate the insertion and extraction of the ground coffee cartridge.

The filter holder 301 of the machine according to the present invention is shown as being suitable for a specific type of pre-filled cartridge, but interchangeable filter holders suitable for any type of cartridge can be provided. Additionally, in the illustrated embodiments the cartridge used is of the rigid or semi-rigid type, but filter packs of flexible material, such as paper or the like, can also be used. In this case, it may be appropriate to modify the shape of the supply unit and the filter holder 301 in such a way as to prevent the filter pack from tending to slip downwards; accordingly, the median plane of coupling of the said supply unit and the filter holder 301 can be given a certain inclination; this inclination can be of the order of an angle ranging from 10° to 30° with respect to the longitudinal axis of the coffee machine.

The invention claimed is:

1. An espresso coffee machine comprising:
   a reservoir for water,
   a pump for delivering the water to a boiler,
   a hot water supply unit, and
   filter holder means for housing a portion of ground coffee, and having a coffee delivery means,
   the hot water supply unit and the filter holder means being coupled together with a seal and having a trajectory of coupling lying in a plane substantially perpendicular to a median plane of coupling of the hot water supply unit and the filter holder means, facing surfaces of the hot water supply unit and the filter holder means coming into contact only at a time of their coupling,
   wherein the filter holder means comprises a hatch hinged at one end to a body of the machine and an end opposite the hinge having releasable coupling means designed to be coupled to suitable coupling means positioned on a wall of the body of the machine, and wherein the median plane of coupling of the hot water supply and the filter holder means is inclined at an angle from 0° to 30° with respect to a longitudinal axis of the machine.

2. The coffee machine according to claim 1, wherein the median plane of coupling of the supply unit and the filter holder means is perpendicular to a base plane of the machine body.

3. The coffee machine according to claim 1, wherein the median plane of coupling of the supply unit and the filter holder means is inclined at an angle ranging from 10° to 30° with respect to a longitudinal axis of the machine.

4. The coffee machine according to claim 1, further comprising switch means interacting with the releasable coupling means of the hatch provided in the proximity of the coupling means positioned on the wall of the body of the machine.

5. The coffee machine according to claim 1, wherein the hatch is hinged releasably to the body of the machine.

6. The coffee machine according to claim 1, wherein the filter holder means comprises a filter holder, comprising a substantially cylindrical cavity provided with a radial hole communicating with the coffee delivery means.

7. The coffee machine according to claim 6, wherein the filter holder is provided with means for assisting with the extraction of a ground coffee cartridge.

8. The coffee machine according to claim 7, wherein the filter holder is provided with means for cleaning the delivery means.

9. The coffee machine according to claim 6, wherein the filter holder is permanently connected to the hatch (3).

10. The coffee machine according to claim 6, wherein the filter holder is inserted movably into the hatch, on two tubular guides, each provided with an inclined surface, interacting with two apertures formed in the base of the cavity of the filter holder, the filter holder being moved along the guides by means associated with the wall of the body of the machine.

11. The coffee machine according to claim 10, wherein a rod is parallel to the guides inserted into the hatch and passes with a seal into the filter holder through a hole which is radial with respect to the cavity of the filter holder, and emerges through the hole for communication with the supply means.

* * * * *